(12) United States Patent
Diederichs

(10) Patent No.: US 7,320,196 B2
(45) Date of Patent: Jan. 22, 2008

(54) FISHING ROD HOLDER

(76) Inventor: Keith William Diederichs, 13116 Xavis St. NW., Coon Rapids, MN (US) 55448

( * ) Notice: Subject to any disclaimer, the term of this patent is extended or adjusted under 35 U.S.C. 154(b) by 0 days.

(21) Appl. No.: 11/318,733

(22) Filed: Dec. 27, 2005

(65) Prior Publication Data

US 2006/0137236 A1    Jun. 29, 2006

Related U.S. Application Data

(60) Provisional application No. 60/639,672, filed on Dec. 28, 2004.

(51) Int. Cl.
*A01K 97/10* (2006.01)
(52) U.S. Cl. ...................................... 43/21.2
(58) Field of Classification Search ................. 43/21.2; 224/922; 248/515, 538, 513; D22/147, D22/148; 211/70.8
See application file for complete search history.

(56) References Cited

U.S. PATENT DOCUMENTS

| | | | | |
|---|---|---|---|---|
| 2,033,007 A | * | 3/1936 | Raithel | 248/538 |
| 2,448,752 A | * | 9/1948 | Wagner | 248/512 |
| 2,971,734 A | * | 2/1961 | Grimes | 248/533 |
| 3,964,706 A | * | 6/1976 | Adams | 43/21.2 |
| 4,425,729 A | * | 1/1984 | Miyamae | 43/21.2 |
| 5,335,440 A | * | 8/1994 | Williams | 43/21.2 |
| 5,446,989 A | * | 9/1995 | Stange et al. | 43/21.2 |
| 5,491,923 A | * | 2/1996 | Zingrone | 43/17 |
| 5,557,876 A | * | 9/1996 | Parker | 43/21.2 |
| 5,813,163 A | * | 9/1998 | Dysarz | 43/21.2 |
| D461,521 S | * | 8/2002 | Krueger | D22/147 |
| 6,626,409 B1 | * | 9/2003 | Thompson | 248/539 |
| 6,910,592 B1 | * | 6/2005 | Lindenmeyer | 211/70.8 |

* cited by examiner

*Primary Examiner*—Kurt Rowan
(74) *Attorney, Agent, or Firm*—Haugen Law Firm PLLP (57) ABSTRACT

A tubular fishing rod holder capable of being used from a portable ice fishing shelter, a bucket, a boat, or a lawn chair. The fishing rod holder having a rearward mounting end, and a forward holding end, wherein the holding end is of sufficient length and diameter to accommodate the handle portion of, for example, ice fishing, spinning, and jigging rods. The rearward mounting end portion comprises upper and lower mounting slots, communicating the rearward end with upper and lower apertures, which a portion of the upper and lower apertures are shaped to form upper and lower locking grooves, allowing the fishing rod holder to be removably mounted to a bucket, and a vertical or angled support in a cantilevered arrangement, positioning a fishing rod within easy reach of a fisherman.

3 Claims, 8 Drawing Sheets

FISHING ROD HOLDER

RELATED APPLICATIONS

The present application claims priority from U.S. provisional patent application, Ser. No. 60/639,672, filed Dec. 28, 2004, for FISHING ROD HOLDER, by Keith W. Diederichs, included by reference herein and for which benefit of the priority date is hereby claimed.

CONFIRMATION NO. 7849

FIELD OF THE INVENTION

The present invention relates to a device for holding a fishing rod in a level or raised position, and more particularly to a rod holder for holding a fishing rod so as to free a fisherman from holding the fishing rod manually. The invention uses a unique mounting arrangement which allows the rod holder to be removably mounted to a support such as, but not limited to, a frame of a portable ice fishing shelter, bucket, or a lawn chair, and keeps a rod and reel from coming into contact with snow, ice, or water, and from loss, due to a biting fish.

BACKGROUND OF THE INVENTION

During the long periods usually devoted to the sport of fishing, avid fisherman often desire and need a break from holding a fishing rod, and fishing rod holders are offered for this purpose. Rod holders were initially used by fisherman while still fishing, but have also come to be utilized during trolling, drifting, and ice fishing. Rod holders range from a forked stick embedded in the bank of a body of water to a variety of tubular, and bent or shaped wire devices that attach to, for example: a dock, chair, boat, bucket, or a portable ice fishing shelter.

Michael D. Parker describes a fishing rod holder, in U.S. Pat. No. 5,557,876 which can be mounted to a support standard from a bank of a body of water, or from a boat, wherein the rod holder is comprised of a tube having a rearward end, a holding portion, and a mounting portion. The mounting portion comprises a top receiving hole, a bottom receiving hole, and a side cut out portion connecting the top and bottom holes.

Parker's rod holder has an extending rearward end, and a side cut out portion, therefore limiting placement options on the various angles of supports used in the construction of portable ice fishing shelters.

In accordance with the present invention it has been found that a fishing rod holder can be provided which is capable of being removably mounted to a support, such as, a frame of a portable ice fishing shelter, or a lawn chair, be adjustable to accommodate a support of any angle, and be versatile to removably mount to a bucket.

It is therefore an object of the present invention to provide a novel fishing rod holder which is capable of being removably mounted to a support, can be positioned anywhere along the length of the support, and be pivoted around the support to a desired position.

It is another object of the present invention to provide a fishing rod holder which is capable of being adjustable to accommodate a support of any angle.

It is also an object of the present invention to provide a fishing rod holder which is capable of being removably mounted to a support and a bucket.

SUMMARY OF THE INVENTION

Principal features of the present invention comprise a tubular rod holding device which is capable of being removably mounted to the frame of a portable ice fishing shelter, or a lawn chair. The tubular rod holder having a forward holding end for receiving and holding the handle of a fishing rod, and a rearward mounting end. The rearward mounting end allows the fishing rod holder to accommodate a bucket, and a support of any angle, comprising upper and lower mounting slots connecting the rearward mounting end with upper and lower openings which are shaped to fit a support and form locking grooves. The fishing rod holder may comprise a plastic tube of such material as polyvinylchloride (PVC) or any suitable plastic and be formed by injection molding. In its broadest sense the present invention is not limited to any specific material or method of manufacture.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the Figures.

DESCRIPTION OF THE PREFERRED EMBODIMENT

Figure 1:
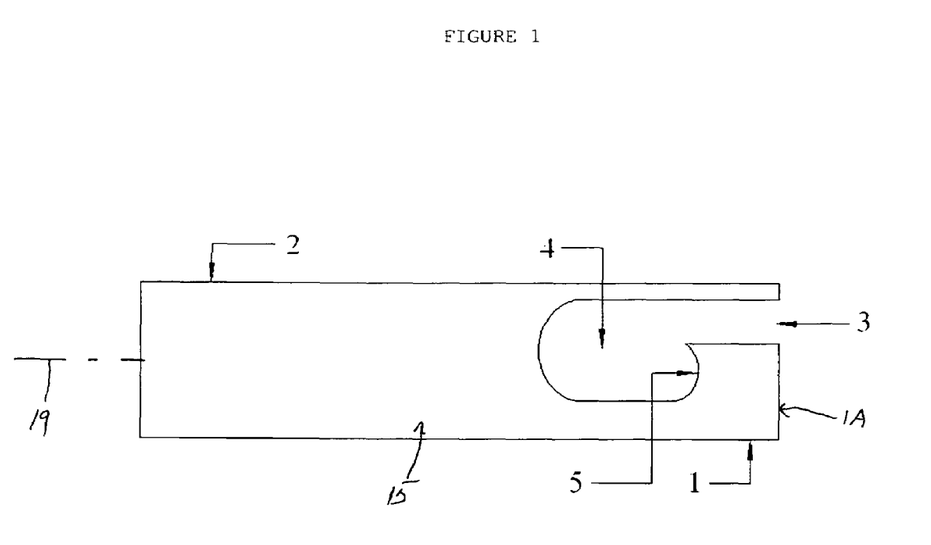
FIG. 1 is a top view of a first embodiment of the fishing rod holder.
Figure 2:
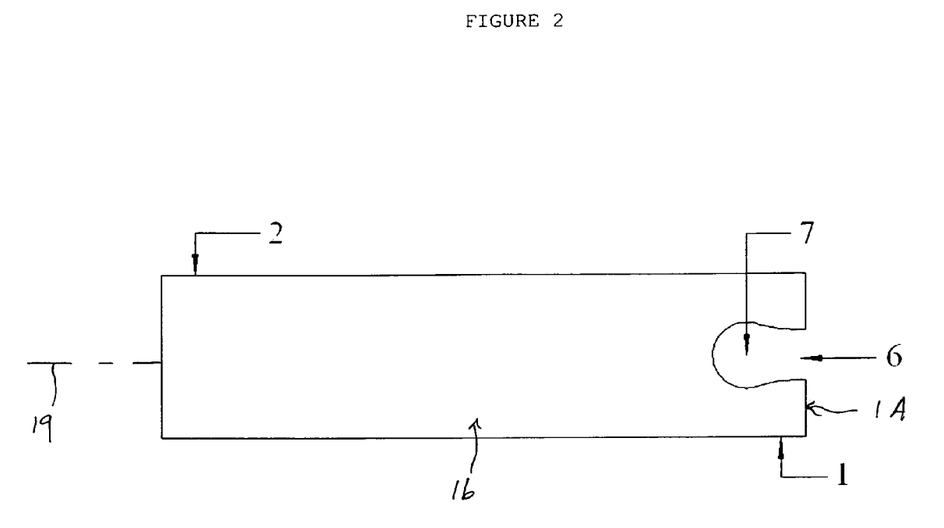
FIG. 2 is a bottom view of a first embodiment of the fishing rod holder.

FIGS. 1 and 2 illustrate the fishing rod holder from two different views, a top view of top portion 15, and a bottom view of bottom portion 16, respectively, wherein the fishing rod holder comprises a rearward mounting end portion 1, and forward holding end portion 2. The fishing rod holder has a tubular form, i.e., pipe form, which may be made from any suitable material, but plastic tubing is preferred, which may comprise injection molded units or PVC tubing.

The forward holding end portion 2 is of sufficient length and diameter to accommodate the handle portion of, for example, ice fishing, spinning, or jigging rods, wherein the forward holding end portion 2 is preferably, but not limited to 1-¼ inches.

The first embodiment of the rearward mounting end portion 1 comprises an upper mounting slot 3, an upper aperture 4, and an upper locking groove 5, as shown in FIG. 1, a lower mounting slot 6, and a lower aperture 7, as shown in FIG. 2. Upper mounting slot 3, and lower mounting slot 6, are of sufficient width to allow a support (not shown) to be passed therethrough. Note that the holding end 2 portion will be level with, or raised higher than rearward mounting end portion 1 in a cantilevered arrangement when the fishing rod holder is mounted to a support, and that the further upper locking groove 5 is from rearward end 1A, wherein lower aperture 7 remains a predetermined distance from rearward end 1A, then the greater the raised height of forward holding end portion 2.

FIG. 1 illustrates upper mounting slot 3, which extends substantially parallel to a longitudinal axis 19 along the top portion 15 from the rearward end 1A communicating the rearward end 1A with upper aperture 4 at a predetermined distance from the rearward end 1A, wherein a portion of upper aperture 4 is shaped to fit a support and forms upper locking groove 5.

FIG. 2 illustrates lower mounting slot 6 which extends substantially parallel to longitudinal axis 19 along the bottom portion 16 from the rearward end 1A communicating the rearward end 1A with lower aperture 7 at a predetermined distance from the rearward end 1A wherein lower aperture 7 is shaped to form a stopping point, and create a locking action onto a support.

Figure 3:
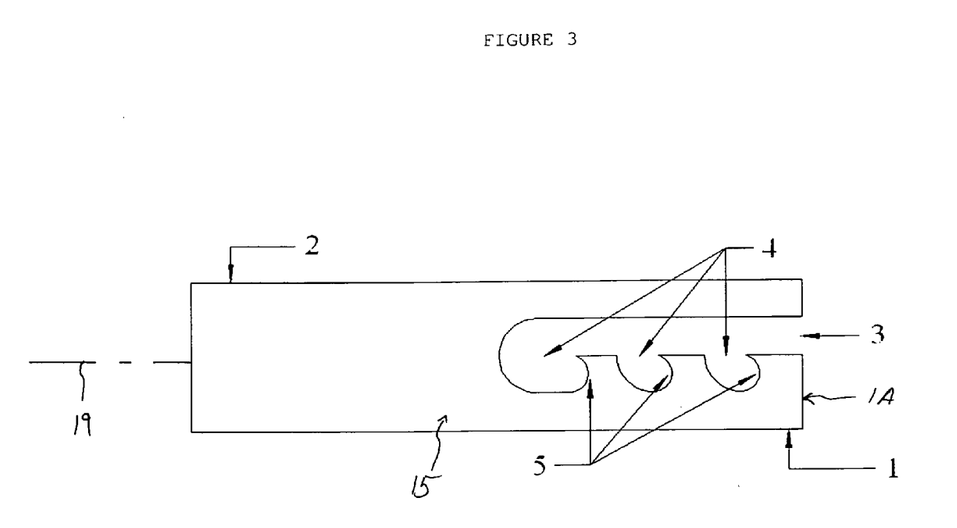
FIG. 3 is a top view of a second embodiment of the fishing rod holder.
Figure 4:
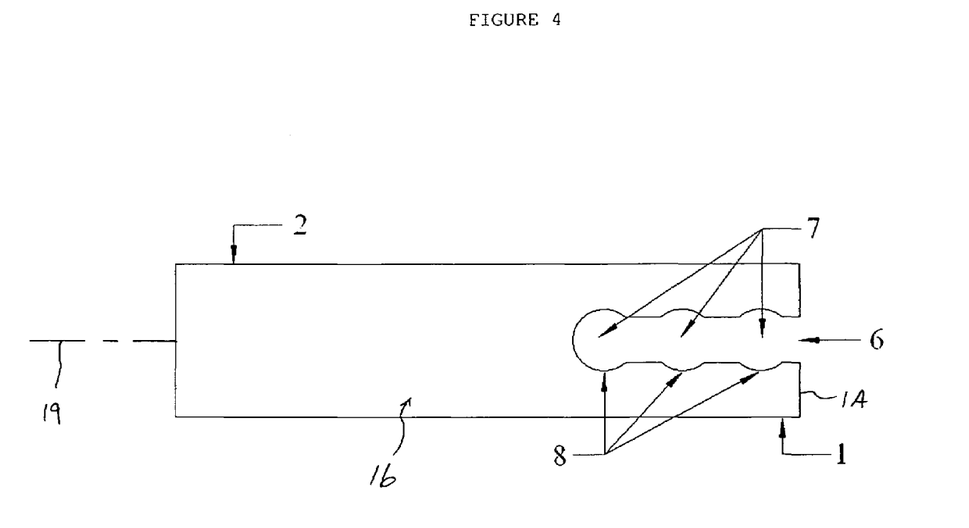
FIG. 4 is a bottom view of a second embodiment of the fishing rod holder.

FIGS. 3 and 4 illustrate a second embodiment of the fishing rod holder from two different views, a top view of top portion 15 and a bottom view of bottom portion 16, respectively. Those components shown in the first embodiment and remaining the same in the second embodiment will have the same reference numerals. The second embodiment differs from the first embodiment at the rearward mounting end portion 1, wherein upper mounting slot 3, and lower mounting slot 6 are extended and communicate a plurality of apertures, which are shaped to form a plurality of locking grooves allowing the fishing rod holder to accommodate a support of any angle. Note that these extended upper and lower mounting elements of the second embodiment are separate and can be used together or individually in conjunction with the upper and lower mounting elements of the first embodiment.

FIG. 3 illustrates an extended upper mounting slot 3 formed along the top portion 15 from the rearward end 1A and communicating the rearward end 1A with multiple upper apertures 4, wherein a portion of the multiple upper apertures 4 are shaped to fit a support, and form multiple upper locking grooves 5. Note that the multiple upper apertures 4 and multiple upper locking grooves 5 are formed at predetermined distances from the rearward end 1A.

FIG. 4 illustrates an extended lower mounting slot 6 formed along the bottom portion 16 from the rearward end 1A and communicating the rearward end 1A with multiple lower apertures 7, wherein a portion of the multiple lower apertures 7 are shaped to fit a support and form multiple lower locking grooves 8. Note that the multiple lower apertures 7 and multiple lower locking grooves 8 are formed at predetermined distances from the rearward end 1A.

Figure 5:
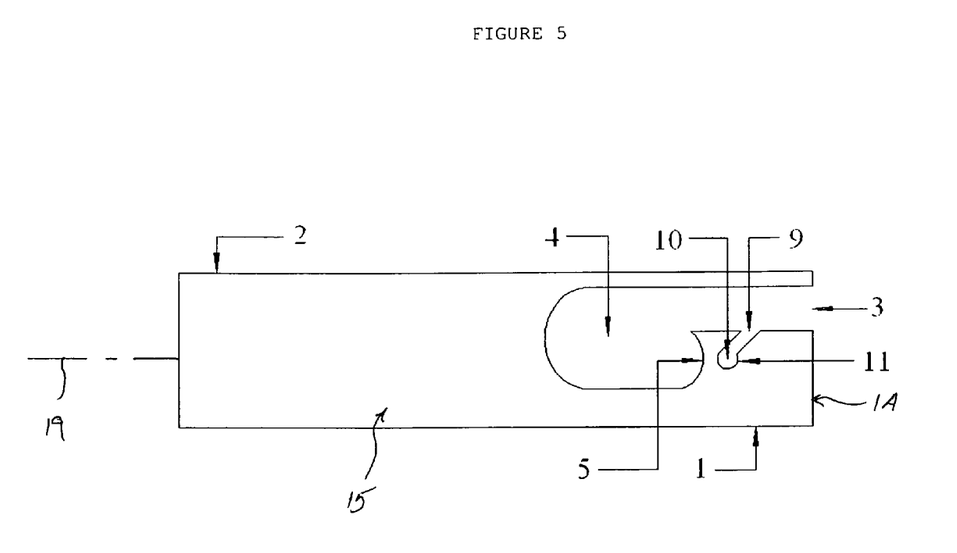
FIG. 5 is a top view of a third embodiment of the fishing rod holder.
Figure 6:
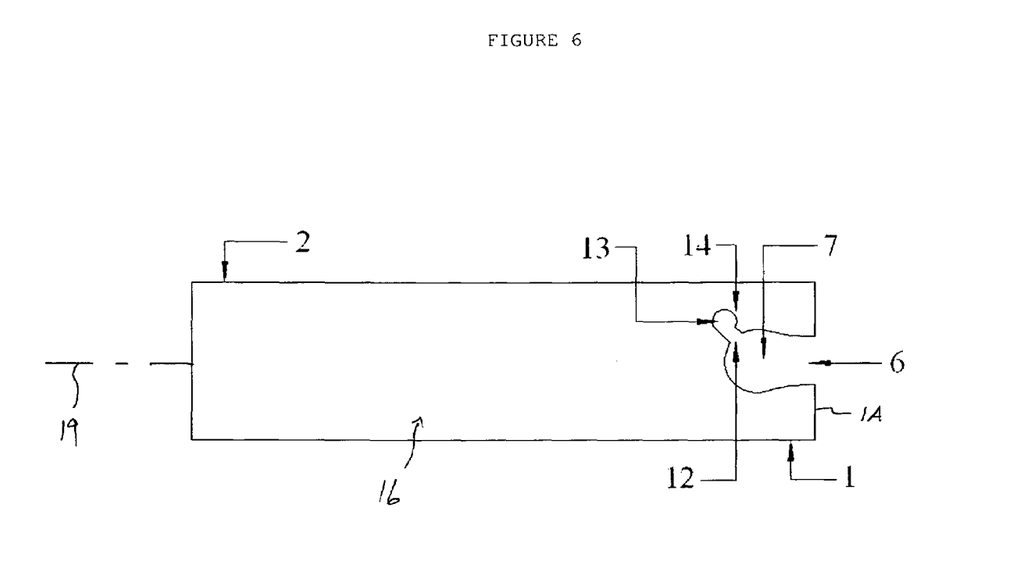
FIG. 6 is a bottom view of a third embodiment of the fishing rod holder.

FIGS. 5 and 6 illustrate a third embodiment of the fishing rod holder from a top view of top portion 15 and a bottom view of bottom portion 16, respectively. Those components shown in FIGS. 1 and 2 of the first embodiment and remaining the same in the third embodiment will have the same reference numerals.

The third embodiment illustrated in FIGS. 5 and 6 differs from the first embodiment at the rearward mounting end portion 1, wherein a second upper mounting slot 9 communicating a second upper aperture 10, shown in FIG. 5, and a second lower mounting slot 12 communicating a second lower aperture 13, shown in FIG. 6, are added to allow the rod holder to be removably mounted onto a bucket.

The rearward mounting end portion 1, shown in FIG. 5, comprises a second upper mounting slot 9 communicating upper mounting slot 3 with a second upper aperture 10, which a portion of second upper aperture 10 is shaped to form locking groove 11.

The rearward mounting end portion 1, shown in FIG. 6, comprises a second lower mounting slot 12 communicating lower aperture 7 with a second lower aperture 13, wherein a portion of second lower aperture 13 is shaped to form locking groove 14. Note that mounting slots 9 and 12, and apertures 10 and 13, shown in FIGS. 5, and 6, are parallel and equal in distance from rearward end 1A, while mounting slots 9 and 12, are preferably, but not limited to a 45 degree angle.

Also note that the mounting elements shown in the third embodiment can be added to any combination of the upper and lower mounting elements of the first and second embodiments, therefore providing a fishing rod holder which is versatile and adjustable to removably mount to a bucket and a support of any angle.

Figure 7:
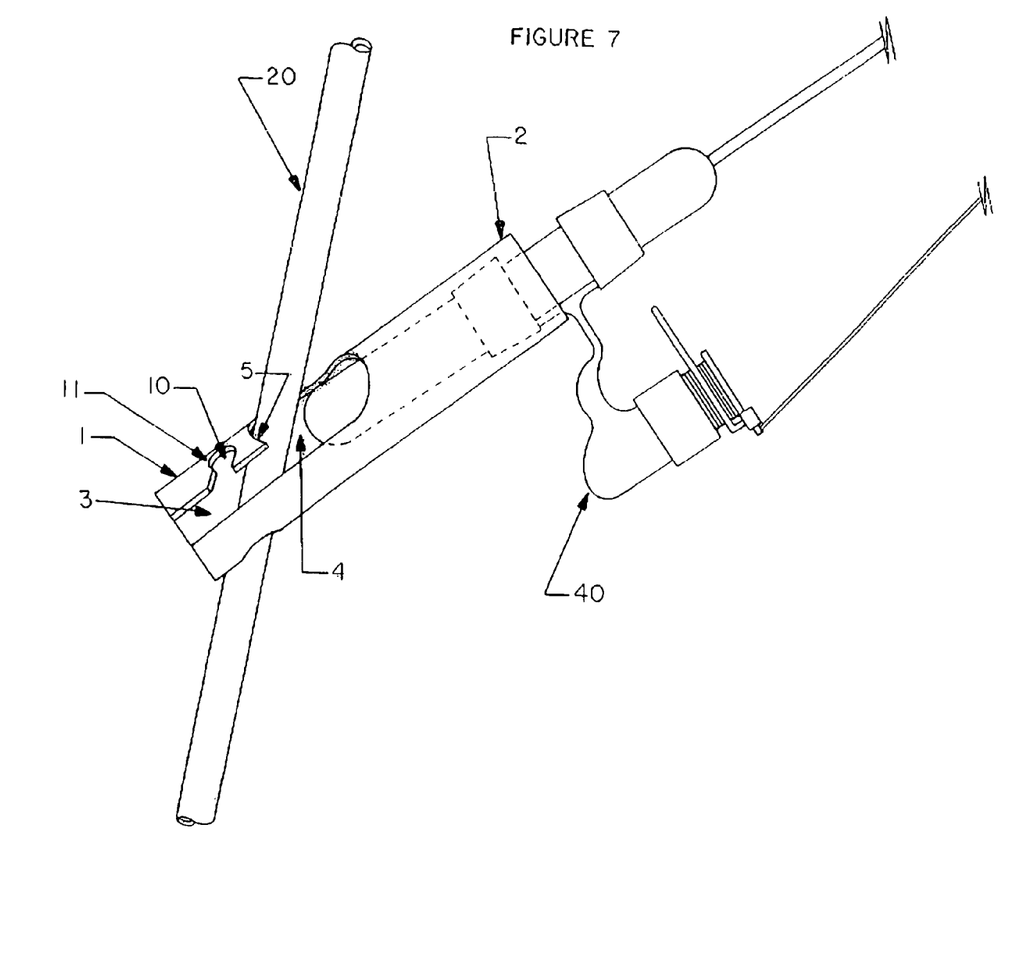
FIG. 7 is a side view of the fishing rod holder in operation.

FIG. 7 illustrates the fishing rod holder in one mode of use, wherein rearward mounting end portion 1 is operably and removably secured to a support 20, and the handle portion of a fishing rod 40 is operably received within forward holding end portion 2.

Figure 8:
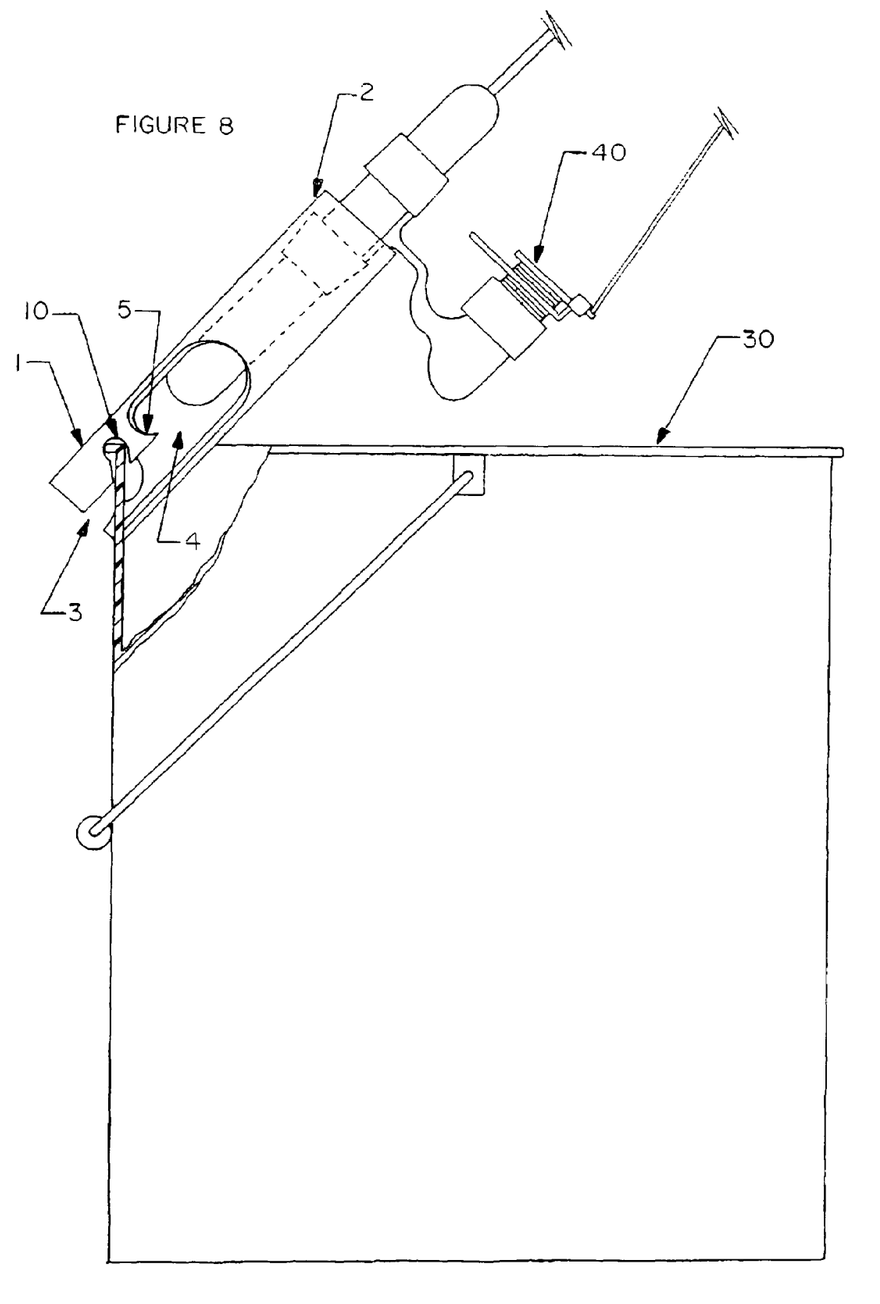
FIG. 8 is a side view of the fishing rod holder in operation.

FIG. 8 illustrates an additional mode of operation of the fishing rod holder, wherein rearward mounting end portion 1 is operably and removably secured to a bucket 30, and a handle portion of a fishing rod 40 is operably received within forward holding end portion 2.

Further, the upper and lower locking grooves, illustrated in FIGS. 1-8, may be coated or lined with a rubber material or gasket to increase friction between the fishing rod holder and the support on which it is mounted.

While preferred embodiments of the present invention have been particularly shown and described, it will be understood by those skilled in the art, that other changes in form and details, such as following the contours of the mounting and holding elements of the present invention to form a fishing rod holder from a wire rod, may be made without departing from the spirit and scope of the present invention. It will be further understood by those skilled in the art that the holder can be used to hold other items, such as a table, a cup holder, and a variety of hooks to hold a hat, coat, camera, etc . . . allowing a fisherman to be organized and have easy access to the equipment and accessories available for use in a portable ice fishing shelter.

I claim:

1. A tubular fishing rod holder formed from a generally cylindrical tube having a longitudinal axis, said tube comprising:
   a forward holding end portion for operably and axially receiving and holding a handle portion of a fishing rod; and
   a rearward mounting end portion for operably and removably mounting said fishing rod holder to a support, said rearward mounting end portion comprising:
   (a) a first upper mounting slot formed along the longitudinal axis in a top portion of said tube and communicating a rearward end of said tube with a first upper aperture formed at a predetermined distance from said rearward end, wherein a portion of said first upper aperture is shaped to fit the support, and said shaped portion of said first upper aperture forms an upper locking groove;
   (b) a first lower mounting slot formed along the longitudinal axis in a bottom portion of said tube and communicating said rearward end with a first lower aperture formed at a predetermined distance from said rearward end, wherein said first lower aperture is shaped to form a stopping point and create a locking action to the support;

(c) a second upper mounting slot of a predetermined length communicating said first upper mounting slot and said rearward end at a predetermined angle with a second upper aperture at a predetermined distance from said rearward end, wherein a portion of said second upper aperture is shaped to form a locking groove; and (d) a second lower mounting slot of a predetermined length communicating said first lower aperture and said rearward end at a predetermined angle with a second lower aperture at a predetermined distance from said rearward end, wherein a portion of said second lower aperture is shaped to form a locking groove;

said second upper and lower mounting slots are parallel and equal in distance from said rearward mounting end.

2. A fishing rod holder formed from a tube of predetermined length and predetermined diameter, wherein said tube has a forward holding end for accommodating a handle of a fishing rod, and a rearward mounting end for removably mounting said fishing rod holder to a bucket and a support of any angle, said rearward mounting end comprising:

a first upper mounting slot formed along the longitudinal axis in a top portion of said tube communicating said rearward mounting end with one or more first upper apertures formed at predetermined distances from said rearward mounting end, wherein a portion of said first upper apertures are shaped to fit a support and form upper locking grooves;

a first lower mounting slot formed along the longitudinal axis in a bottom portion of said tube communicating said rearward mounting end with one or more first lower apertures formed at predetermined distances from said rearward mounting end, wherein a portion of said first lower apertures are shaped to fit a support and form lower locking grooves;

a second upper mounting slot formed at a predetermined length and a predetermined angle in a top portion of said tube communicating said first upper mounting slot and said rearward mounting end with a second upper aperture, wherein a portion of said second aperture is shaped to form a locking groove;

a second lower mounting slot formed at a predetermined length and a predetermined angle in a bottom portion of said tube communicating said first lower aperture and said rearward mounting end with a second lower aperture, wherein a portion of said second lower aperture is shaped to form a locking groove;

said second upper mounting slot communicated with said second upper aperture, and said second lower mounting slot communicated with said second lower aperture are parallel and equal in distance from said rearward mounting end.

3. The fishing rod holder as set forth in claim 2, wherein said tube is formed from a lightweight noncorrosive material.

\* \* \* \* \*